(12) United States Patent
Bhattacharya et al.

(10) Patent No.: US 9,844,019 B1
(45) Date of Patent: *Dec. 12, 2017

(54) ESTIMATING THE LOCATION OF A WIRELESS TERMINAL IN WIRELESS TELECOMMUNICATIONS SYSTEMS THAT COMPRISE DISTRIBUTED AND/OR REPEATER ANTENNAS

(71) Applicant: Polaris Wireless, Inc., Mountain View, CA (US)

(72) Inventors: Tarun Kumar Bhattacharya, San Jose, CA (US); David Stevenson Spain, Jr., Portola Valley, CA (US); Hassan Mohamed El-Sallabi, Palo Alto, CA (US); Robert Lewis Martin, Antioch, CA (US)

(73) Assignee: Polaris Wireless, Inc., Mountain View, CA (US)

( * ) Notice: Subject to any disclaimer, the term of this patent is extended or adjusted under 35 U.S.C. 154(b) by 178 days.

This patent is subject to a terminal disclaimer.

(21) Appl. No.: 14/458,001

(22) Filed: Aug. 12, 2014

Related U.S. Application Data

(63) Continuation of application No. 13/598,668, filed on Aug. 30, 2012, now Pat. No. 8,838,137.

(51) Int. Cl.
*H04W 64/00* (2009.01)
(52) U.S. Cl.
CPC .................................. *H04W 64/00* (2013.01)
(58) Field of Classification Search
CPC ....... H04W 64/00; H04W 4/001; H04W 4/02; H04W 4/20; H04W 12/08; H04W 4/025; H04W 4/04; H04W 12/06; H04W 4/023; H04W 4/043; H04W 36/32; H04W 48/02; H04W 4/003; H04W 4/046; H04W 4/12; H04W 4/206; H04W 76/021; H04W 84/005

(Continued)

(56) References Cited

U.S. PATENT DOCUMENTS 7,136,652 B2  1/2006  Riley et al.
7,433,695 B2  9/2008  Gordon et al.

(Continued)

OTHER PUBLICATIONS

"Parent U.S. Appl. No. 13/598,668", "NonFinal Office Action", dated Apr. 8, 2014, Publisher: USPTO, Published in: US.

(Continued)

*Primary Examiner* — Marsha D. Banks Harold
*Assistant Examiner* — Natasha W Cosme
(74) *Attorney, Agent, or Firm* — McGeary Cukor LLC; Kenneth Ottesen; Jason Paul DeMont

(57) ABSTRACT

A technique for estimating the location of a wireless terminal at an unknown location in a geographic region is disclosed. The technique is based on the recognition that there are location-dependent traits of electromagnetic signals. In environments where multiple antennas are radiating the same signal, as in the case of distributed antennas or host-repeater configurations, one or more possible locations of the wireless terminal can be designated as improbable based on i) a measure of the propagation delay of a signal traveling between a) a base station and b) the wireless terminal or an infrastructure antenna, or ii) the maximum distance at which a signal is detectable by the wireless terminal. Additionally, the applicable set of values for the location-dependent traits is selected based on similar criteria.

32 Claims, 12 Drawing Sheets

(58) Field of Classification Search
USPC .............................................. 455/456.1–457
See application file for complete search history.

(56) References Cited

U.S. PATENT DOCUMENTS

| | | |
|---|---|---|
| 7,715,849 B2 | 5/2010 | Spirito et al. |
| 7,925,205 B2 | 4/2011 | Kennedy, Jr. et al. |
| 8,045,917 B2 | 10/2011 | Beck et al. |
| 8,223,821 B2 | 7/2012 | Hannan et al. |
| 2002/0115448 A1 | 8/2002 | Amerga et al. |
| 2003/0045305 A1 | 3/2003 | Ogino et al. |
| 2003/0190919 A1 | 10/2003 | Niemenmaa |
| 2008/0299993 A1 | 12/2008 | Gordon et al. |
| 2009/0017837 A1 | 1/2009 | Kim, II et al. |
| 2009/0280829 A1 | 11/2009 | Feuerstein |
| 2009/0299788 A1 | 12/2009 | Huber et al. |
| 2010/0190509 A1 | 7/2010 | Davis |
| 2010/0222075 A1 | 9/2010 | Miura |
| 2012/0178473 A1 | 7/2012 | Wiren et al. |
| 2012/0302263 A1 | 11/2012 | Tinnakornsrisuphap et al. |

OTHER PUBLICATIONS

"Parent U.S. Appl. No. 13/598,668", "NonFinal Office Action", dated Apr. 30, 2013, Publisher: USPTO, Published in: US.
"Parent U.S. Appl. No. 13/598,668", "Notice of Allowability", dated May 15, 2014, Publisher: USPTO, Published in: US.

ESTIMATING THE LOCATION OF A WIRELESS TERMINAL IN WIRELESS TELECOMMUNICATIONS SYSTEMS THAT COMPRISE DISTRIBUTED AND/OR REPEATER ANTENNAS

CROSS-REFERENCE TO RELATED APPLICATION(S)

This application is a continuation of U.S. patent application Ser. No. 13/598,668, filed on Aug. 30, 2012, which is incorporated herein by reference.

FIELD OF THE INVENTION

The present invention relates to telecommunications in general, and, more particularly, to a technique for estimating the location of a wireless terminal in wireless telecommunications systems that comprise distributed and/or repeater antennas.

BACKGROUND OF THE INVENTION

FIG. 1 depicts a diagram of the salient components of wireless telecommunications system 100 in accordance with the prior art. Wireless telecommunications system 100 comprises: wireless terminal 101, base stations 102-1 and 102-2, distributed antenna 103, repeater antenna 104, and wireless switching center 111, interrelated as shown. Wireless telecommunications system 100 provides wireless telecommunications service to all of geographic region 120, in well-known fashion.

Base station 102-1 comprises an antenna that radiates a first signal into geographic region 120. The first signal has a limited range, however, and, therefore, is receivable and decodable in a limited area. To increase the area in which the first signal is receivable and decodable, wireless telecommunications system 100 employs an additional antenna—distributed antenna 103—to also radiate the first signal. Distributed antenna 103 receives the first signal from base station 102-1, via wireline transmission medium 103-3, and also radiates the first signal. From the perspective of wireless terminal 101, the first signal as radiated by base station 102-1 is indistinguishable from the first signal as radiated by distributed antenna 103, and, therefore, by working together, base station 102-1 and distributed antenna 103 increase the area in which the first signal is receivable and decodable.

Base station 102-2 comprises an antenna that radiates a second signal into geographic region 120. The second signal has a limited range, however, and, therefore, is receivable and decodable in a limited area. To increase the area in which the second signal is receivable and decodable, wireless telecommunications system 100 employs an additional antenna—repeater antenna 104—to also radiate the second signal. Repeater antenna 104 receives the second signal from base station 102-2, wirelessly, and "repeats" or re-radiates the second signal. From the perspective of wireless terminal 101, the second signal as radiated by base station 102-2 is indistinguishable from the second signal as radiated by repeater antenna 104, and, therefore, by working together, base station 102-2 and repeater antenna 104 increase the area in which the second signal is receivable and decodable.

Although the details of how distributed antenna 103 and repeater antenna 104 are built and operated are different, their effect is, for the purposes of the present specification, essentially the same as a base station antenna. Each radiates a signal to and for a wireless terminal. For the purposes of this specification, an "infrastructure antenna" is defined as an antenna in a wireless telecommunications system that radiates a signal to and for a wireless terminal.

The salient advantage of wireless telecommunications over wireline telecommunications is the mobility that is afforded to the user of the wireless terminal. On the other hand, the salient disadvantage of wireless telecommunications lies in that fact that because the user is mobile, an interested party might not be able to readily ascertain the location of the user.

Such interested parties might include both the user of the wireless terminal and a remote party. There are a variety of reasons why the user of a wireless terminal might be interested in knowing his or her location. For example, the user might be interested in telling a remote party where he or she is or, alternatively, the user might seek advice in navigation.

In addition, there are a variety of reasons why a remote party might be interested in knowing the location of the user. For example, the recipient of an E 9-1-1 emergency call from a wireless terminal might be interested in knowing the location of the wireless terminal so that emergency services vehicles can be dispatched to that location.

There are many techniques in the prior art for estimating the location of a wireless terminal. A number of these techniques need to know which infrastructure antenna radiates the signal that is received and decoded by the wireless terminal. In wireless telecommunications systems without distributed or repeater antennas, this is generally not a problem because each signal is uniquely associated with one infrastructure antenna. Therefore, the decoding and identification of a signal is tantamount to the identification of the infrastructure antenna that radiated it.

In wireless telecommunications systems with distributed and/or repeater antennas, however, the decoding and identification of a signal does not indicate which infrastructure antenna radiated it. Therefore, the need exists for a technique for estimating the location of a wireless terminal in a wireless telecommunications system that comprises distributed and/or repeater antennas.

SUMMARY OF THE INVENTION

The present invention enables the construction and use of a system that can estimate the location of a wireless terminal in the presence of multiple antennas that transmit the same signal, without some of the costs and limitations associated with techniques for doing so in the prior art.

The technique is based on the recognition that there are location-dependent traits of electromagnetic signals. For example, if a particular radio station is known to be received strongly at a first possible location and weakly at a second possible location, and a given wireless terminal at an unknown location is receiving the radio station weakly, it is more likely that the wireless terminal is at the second location than at the first location. Depending on the circumstances, the first location can be designated as "improbable."

In accordance with the illustrative embodiment of the present invention, one or more possible locations of the wireless terminal can be designated as improbable based on a measure of propagation delay between a base station and the wireless terminal. This is part of a process referred to as "search area reduction" and can be used, among other situations, in environments where two or more antennas are radiating the same signal, as in the case of distributed antennas or host-repeater configurations. For example, if the distance implied by the measure of the propagation delay is small relative to the cable delay between a base station and a remote, distributed antenna, then the radiating source of the signal must be the base station's collocated antenna, thereby making one or more possible locations associated with the distributed antenna improbable. Similarly for the host-repeater configuration, if the distance implied by the measure of the propagation delay is small relative to the distance from the host base station to an associated repeater, then the radiating source of the signal must be the base station's antenna, thereby making one or more possible locations associated with the repeater improbable.

Additionally, one or more possible locations of the wireless terminal can be designated as improbable based on the maximum distance at which a signal is detectable by the wireless terminal. For example, if the distance implied by the received measure of the propagation delay exceeds the maximum distance associated with a particular infrastructure antenna, then the radiating source of the signal must not be that antenna. This is because the distance implied by the received measure of propagation delay exceeds the maximum distance at which a signal radiated from an antenna collocated with the base station might be expected to be detectable, thereby making one or more possible locations associated with the base station's antenna improbable. A similar rationale applies for the host-repeater configuration. That is, a location associated with the base station can be eliminated if the distance implied by the received measure of propagation delay exceeds the maximum distance at which a signal radiated from an antenna at the base station might be expected to be detectable, thereby making one or more possible locations associated with the base station's antenna improbable.

In accordance with the illustrative embodiment of the present invention, the applicable set of values for the location-dependent traits is selected, referred to as "map selection," based on similar criteria as described in the previous paragraph. The difference is that in search area reduction, one or more possible locations associated with an infrastructure antenna are designated as improbable whereas in map selection, a map associated with an infrastructure antenna is selected.

The disclosed techniques are advantageous, at least in part because they enable a location estimation system to remove at least some of the ambiguity about the radiating source of the signal that is measured by the wireless terminal and used by the system.

An illustrative embodiment of the present invention comprises: receiving, by a data processing system, (i) a measure of a propagation delay of a first signal traveling between a wireless terminal and a base station, and (ii) a measure of a location-dependent trait of a second signal that is received by the wireless terminal; designating, by the data processing system, at least one of a plurality of possible locations of the wireless terminal as improbable based on the measure of the propagation delay of the first signal; and estimating, by the data processing system, the location of the wireless terminal based on: (i) the measure of the location-dependent trait of the second signal, and (ii) one or more possible locations of the wireless terminal not designated as improbable.

DETAILED DESCRIPTION

For the purposes of this specification, the following terms and their inflected forms are defined as follows:

The term "location" is defined as a zero-dimensional point, a finite one-dimensional path segment, a finite two-dimensional surface area, or a finite three-dimensional volume.

The term "environmental conditions N," are defined to include one or more physical aspects of the environment, and includes, but is not limited to, the weather, the astronomical conditions, atmospheric conditions, the quantity and density of radio traffic, the quantity and density of vehicular traffic, road and sidewalk construction, etc.

The term "calendrical time T" is defined as the time as denominated in one or more measures (e.g., seconds, minutes, hours, time of day, day, day of week, month, month of year, year, etc.).

The term "wireless terminal" is defined as a wireless telecommunications terminal that is capable of transmitting and/or receiving communications wirelessly. As is well known to those skilled in the art, a wireless terminal is also commonly referred to by a variety of alternative names such as a wireless transmit/receive unit (WTRU), a user equipment (UE), a mobile station, a fixed or mobile subscriber unit, a pager, a cellular telephone, a personal digital assistant (PDA), a computer, or any other type of device capable of operating in a wireless environment.

Overview—

Figure 1:
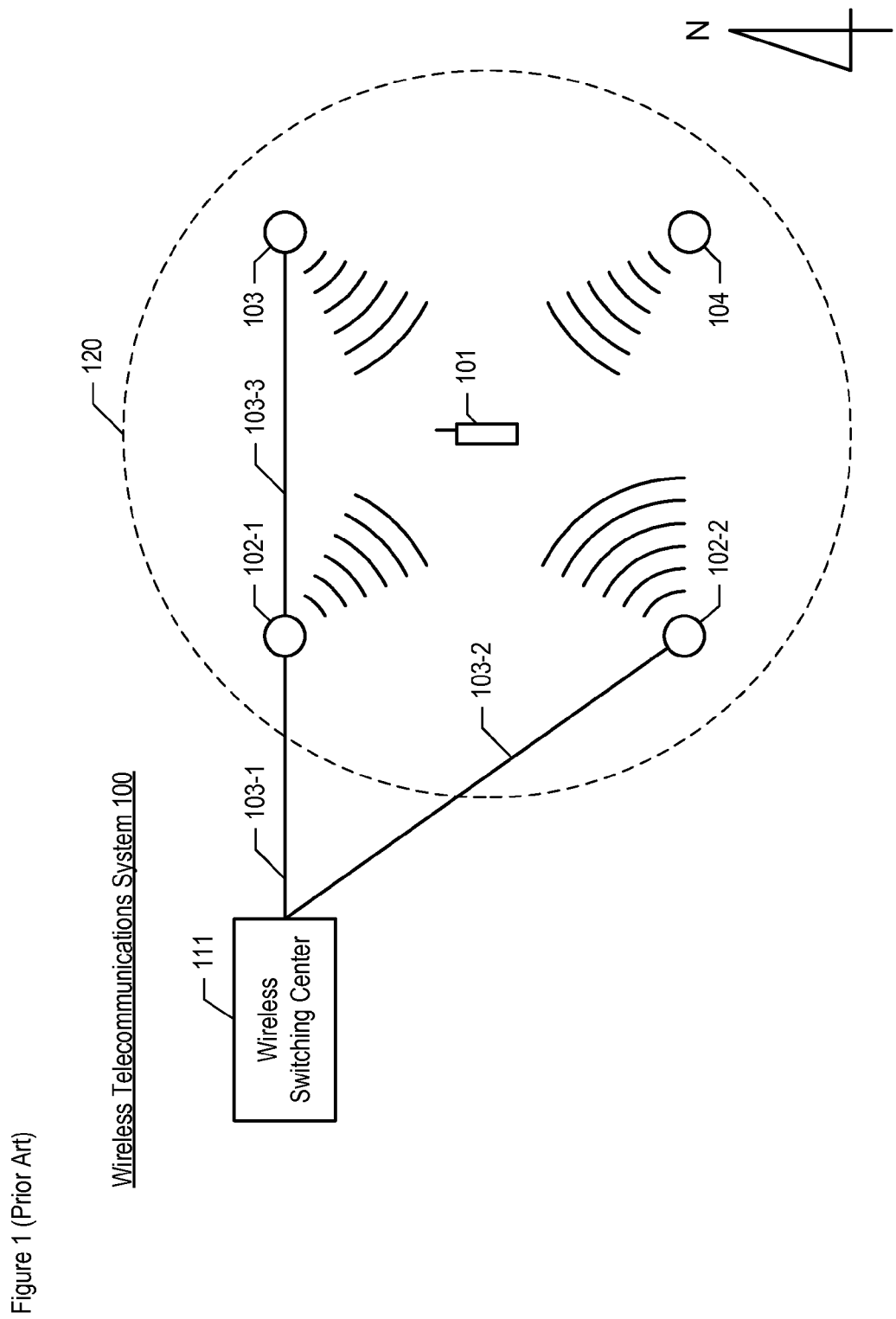
FIG. 1 depicts a diagram of the salient components of wireless telecommunications system 100 in accordance with the prior art.
Figure 2:
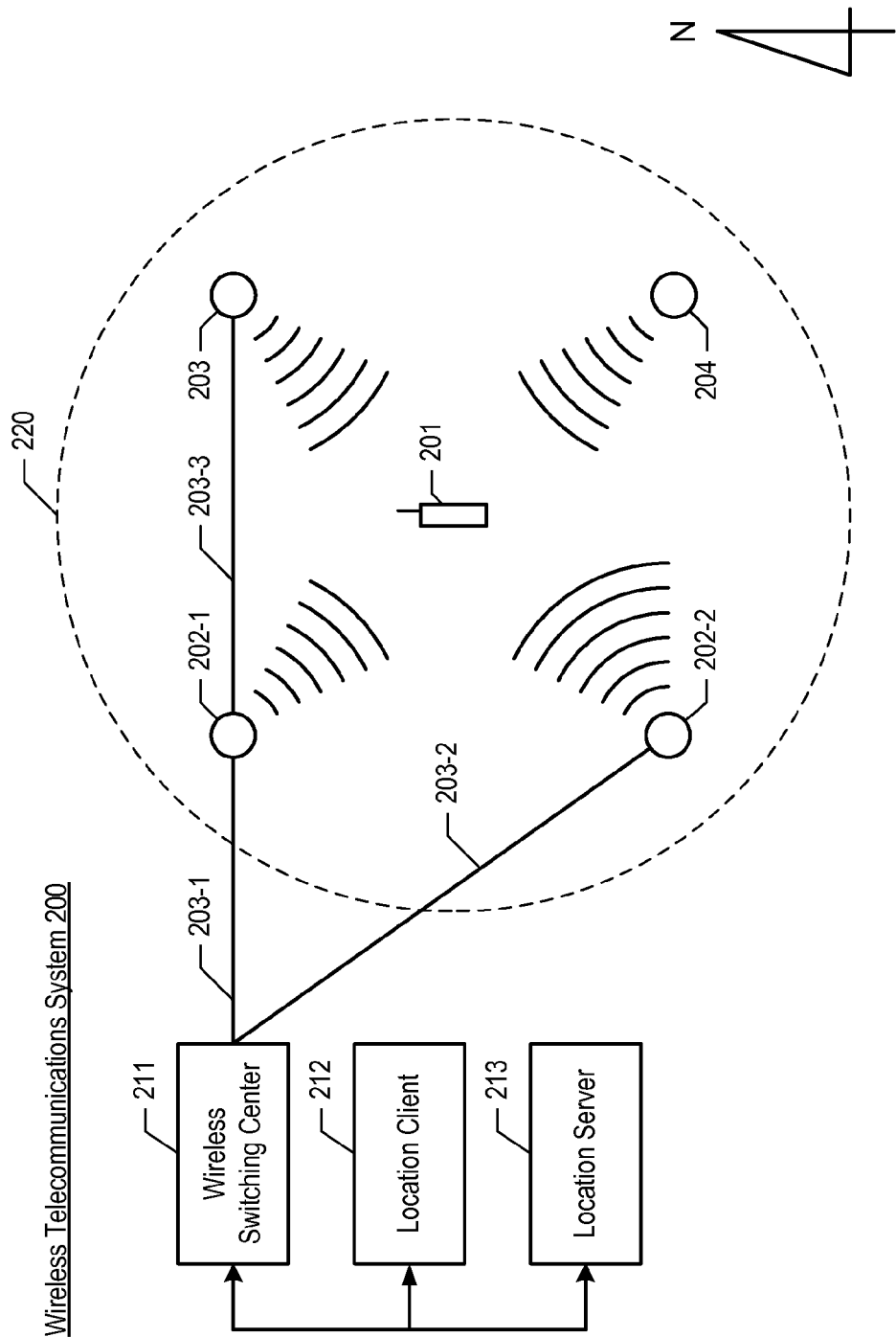
FIG. 2 depicts a diagram of the salient components of wireless telecommunications system 200 in accordance with the illustrative embodiment of the present invention.

FIG. 2 depicts a diagram of the salient components of wireless telecommunications system 200 in accordance with the illustrative embodiment of the present invention. Wireless telecommunications system 200 comprises: wireless terminal 201, base stations 202-1 and 202-2, distributed antenna 203, repeater antenna 204, wireless switching center 211, location client 212, and location server 213, which are interrelated as shown. The illustrative embodiment provides wireless telecommunications service to all of geographic region 220, in well-known fashion, estimates the location of wireless terminal 201 within geographic region 220, and uses that estimate in a location-based application.

In accordance with the illustrative embodiment, wireless telecommunications service is provided to wireless terminal 201 in accordance with the GSM air-interface standard. After reading this disclosure, however, it will be clear to those skilled in the art how to make and use alternative embodiments of the present invention that operate in accordance with one or more other air-interface standards (e.g., Universal Mobile Telecommunications System "UMTS", Long Term Evolution "LTE," CDMA-2000, IS-136 TDMA, IS-95 CDMA, 3G Wideband CDMA, IEEE 802.11 WiFi, 802.16 WiMax, Bluetooth, etc.) in one or more frequency bands.

Wireless terminal 201 comprises the hardware and software necessary to be GSM-compliant and to perform the processes described below and in the accompanying figures. For example and without limitation, wireless terminal 201 is capable of:
  i. measuring one or more location-dependent traits (e.g., signal strength, etc.) of one of more electromagnetic signals and of reporting the measurements to location server 213, and
  ii. transmitting one or more signals and of reporting the transmission parameters of the signals to location server 213.

Wireless terminal 201 is mobile and can be at any location within geographic region 220. Although wireless telecommunications system 200 as depicted comprises only one wireless terminal, it will be clear to those skilled in the art, after reading this disclosure, how to make and use alternative embodiments of the present invention that comprise any number of wireless terminals.

Base stations 202-1 and 202-2 communicate with wireless switching center 211, via wireline transmission media 203-1 and 203-2 respectively, and with wireless terminal 201 via radio, all in well-known fashion. In accordance with the illustrative embodiment, each of base stations 202-1 and 202-2 has one or more infrastructure antennas that are collocated with the base station (e.g., proximate to the base station electronics, etc.).

Base station 202-1 supports an associated distributed antenna system (DAS), as is known in the art, which comprises distributed antenna 203 as well as the base station's own collocated infrastructure antenna or antennas. As part of the distributed antenna system supported by base station 202-1, antenna 203 radiates signal content that is similar or identical to that radiated by one or more of the other infrastructure antennas associated with base station 202-1. Wireline transmission medium 203-3 carries signals between base station 202-1 and distributed antenna 203, in well-known fashion.

Although a single distributed antenna (i.e., antenna 203) is depicted, it will be clear to those skilled in the art, after reading this disclosure, how to make and use alternative embodiments of the present invention in which:
  (i) any number of distributed antennas are used, or
  (ii) any distribution topology is used, or
  (iii) any overall coverage area is achieved, or
  (iv) any combination of i, ii, and iii.

Base station 202-2 serves as "host" to repeater antenna 204, as is known in the art, in that base station 202-2 and repeater antenna 204 exchange signals over the air with each other. Repeater antenna 204 comprises radio equipment and radio-frequency (RF) amplification required for effective transmission through its own infrastructure antenna, in well-known fashion.

Although a single repeater (i.e., repeater antenna 204) is depicted, it will be clear to those skilled in the art, after reading this disclosure, how to make and use alternative embodiments of the present invention in which:
  (i) any number of repeaters are used, or
  (ii) any distribution topology is used, or
  (iii) any overall coverage area is achieved, or
  (iv) any combination of i, ii, and iii.

Furthermore, it will be clear to those skilled in the art, after reading this specification, how to make and use alternative embodiments in which a single base station interoperates with both a distributed antenna system and one or more repeaters.

Although the illustrative embodiment comprises the depicted combination of base stations, it will be clear to those skilled in the art, after reading this disclosure, how to make and use alternative embodiments of the present invention that comprise different combinations of base stations.

As is well known to those skilled in the art, base stations are also commonly referred to by a variety of alternative names such as access points, nodes (e.g., Node-B, eNode-B, etc.), network interfaces, etc. Moreover, although the illustrative embodiment comprises two base stations, it will be clear to those skilled in the art, after reading this disclosure, how to make and use alternative embodiments of the present invention that comprise any number of base stations.

In accordance with the illustrative embodiment of the present invention, the base stations are terrestrial, immobile, and within geographic region 220. It will be clear to those skilled in the art, after reading this disclosure, how to make and use alternative embodiments of the present invention in which some or all of the base stations are airborne, marine-based, or space-based, regardless of whether or not they are moving relative to the Earth's surface, and regardless of whether or not they are within geographic region 220.

Wireless switching center 211 comprises a switch that orchestrates the provisioning of telecommunications service to wireless terminal 201 and the flow of information to and from location server 213, as described below and in the accompanying figures. As is well known to those skilled in the art, wireless switching centers are also commonly referred to by other names such as mobility management entities (MME), mobile switching centers (MSC), mobile telephone switching offices (MTSO), routers, etc.

Although the illustrative embodiment comprises one wireless switching center, it will be clear to those skilled in the art, after reading this disclosure, how to make and use alternative embodiments of the present invention that comprise any number of wireless switching centers. For example, when a wireless terminal can interact with two or more wireless switching centers, the wireless switching centers can exchange and share information that is useful in estimating the location of the wireless terminal. The use of two or more wireless switching centers is particularly common when the geographic area serviced by the wireless switching center is small (e.g., local area networks, etc.) or when multiple wireless switching centers serve a common area.

In accordance with the illustrative embodiment, all of the base stations servicing wireless terminal 201 are associated with wireless switching center 211. It will be clear to those skilled in the art, after reading this disclosure, how to make and use alternative embodiments of the present invention in which any number of base stations are associated with any number of wireless switching centers.

Location client 212 comprises hardware and software that use the estimate of the location of wireless terminal 201—provided by location server 213—in a location-based application, as described below and in the accompanying figures.

Location server 213 comprises hardware and software that generate one or more estimates of the location of wireless terminal 201 as described below and in the accompanying figures. It will be clear to those skilled in the art, after reading this disclosure, how to make and use location server 213. Furthermore, although location server 213 is depicted in FIG. 2 as physically distinct from wireless switching center 211, it will be clear to those skilled in the art, after reading this disclosure, how to make and use alternative embodiments of the present invention in which location server 213 is wholly or partially integrated with wireless switching center 211.

In accordance with the illustrative embodiment, location server 213 communicates with wireless switching center 211 and location client 212 via a local area network; however it will be clear to those skilled in the art, after reading this disclosure, how to make and use alternative embodiments of the present invention in which location server 213 communicates with one or more of these entities via a different network such as, for example, the Internet, the Public Switched Telephone Network (PSTN), etc.

In accordance with the illustrative embodiment, wireless switching center 211, location client 212, and location server 213 are outside of geographic region 220. It will be clear to those skilled in the art, after reading this disclosure, how to make and use alternative embodiments of the present invention in which some or all of wireless switching center 211, location client 212, and location server 213 are instead within geographic region 220.

Location Server 213—

Figure 3:
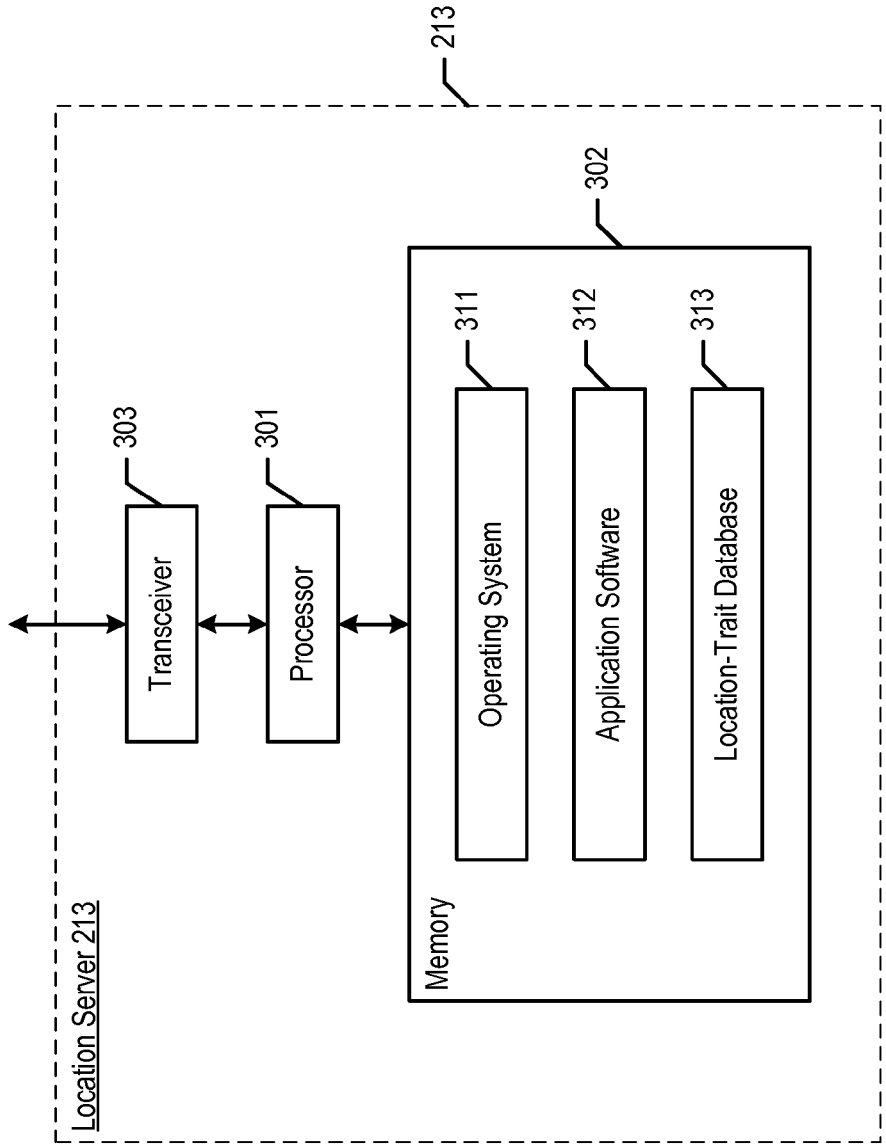
FIG. 3 depicts a block diagram of the salient components of location server 213 in accordance with the illustrative embodiment of the present invention.
Figure 4A:
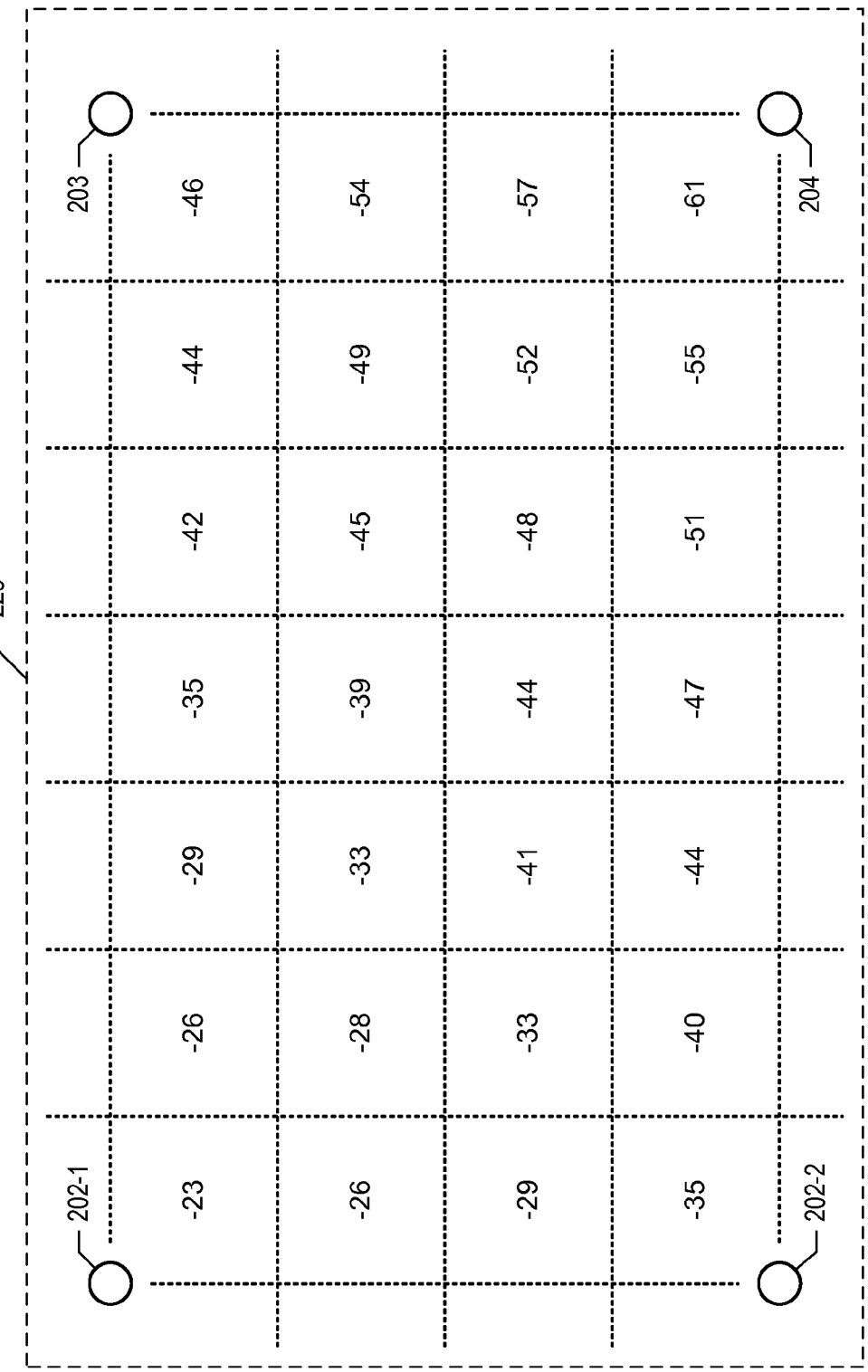
FIGS. 4A-4D depict a plurality of radio frequency (RF) maps.
Figure 4B:
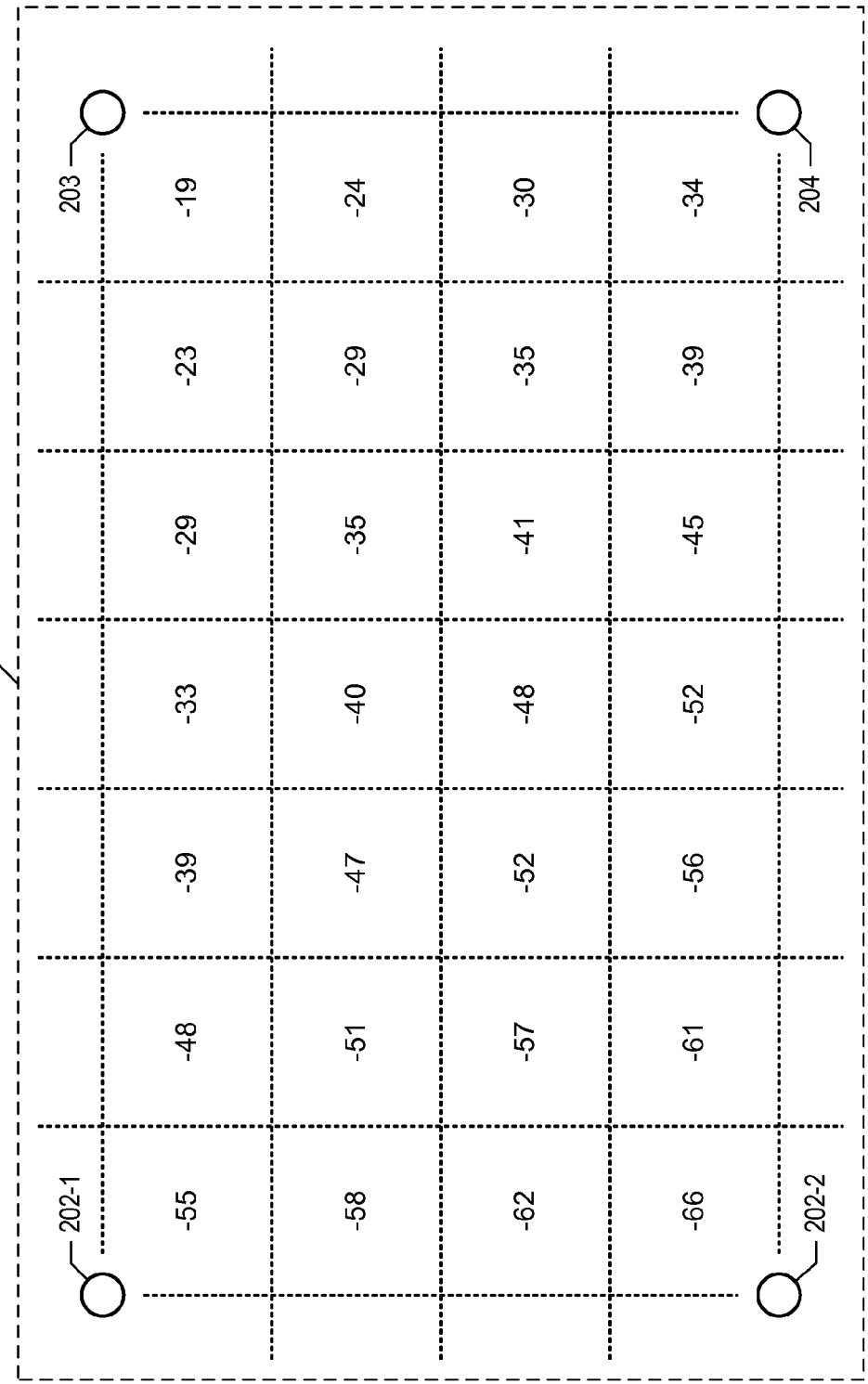
Figure 4C:
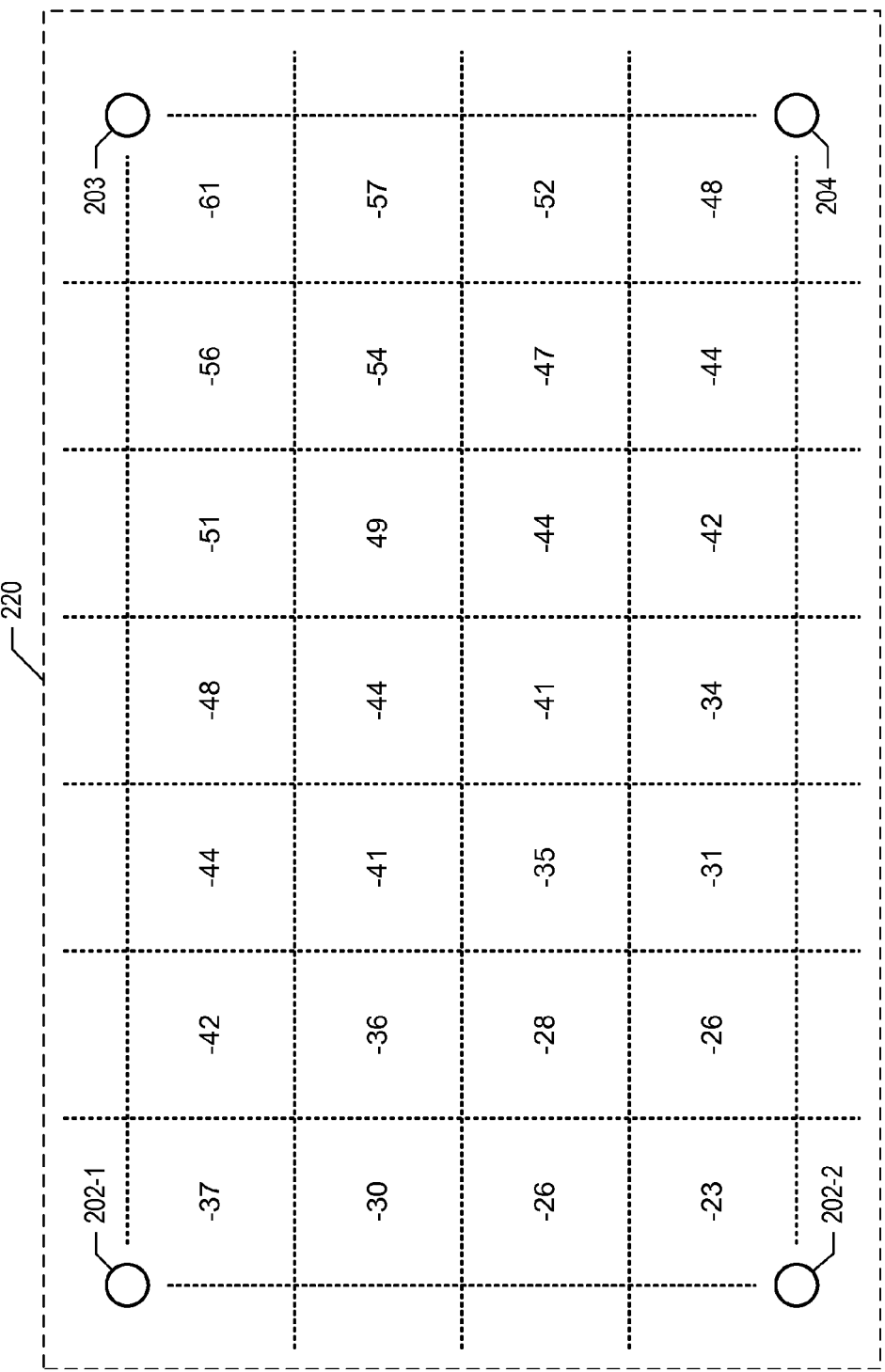
Figure 4D:
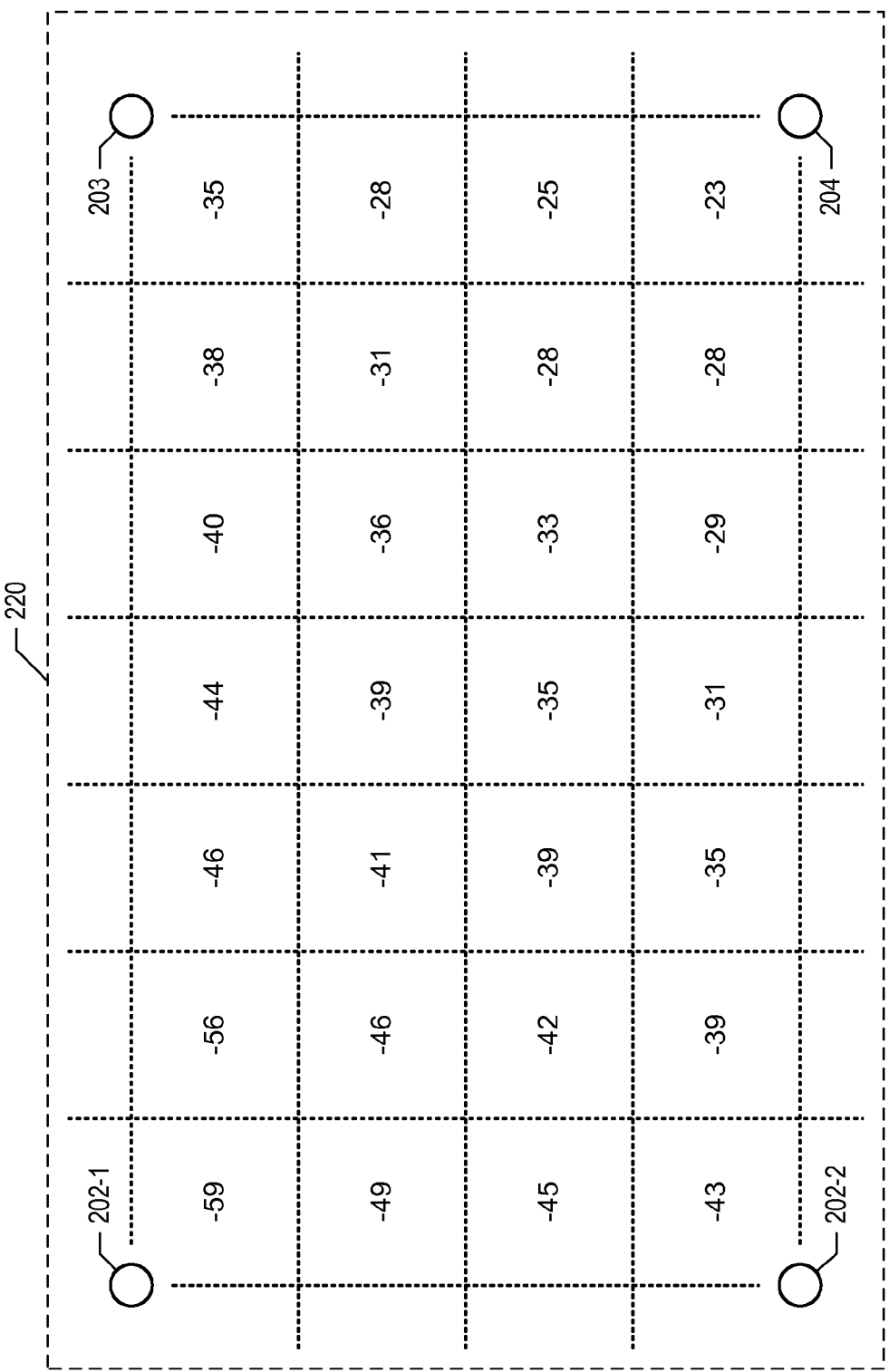

FIG. 3 depicts a block diagram of the salient components of location server 213 in accordance with the illustrative embodiment. Location server 213 comprises: processor 301, memory 302, and local-area network transceiver 303, which are interconnected as shown.

Processor 301 is a general-purpose processor that is capable of executing operating system 311 and application software 312, and of populating, amending, using, and managing Location-Trait Database 313, as described in detail below and in the accompanying figures. It will be clear to those skilled in the art how to make and use processor 301.

Memory 302 is a non-volatile memory that stores:
  i. operating system 311, and
  ii. application software 312, and
  iii. Location-Trait Database 313.
It will be clear to those skilled in the art how to make and use memory 302.

Transceiver 303 enables location server 213 to transmit and receive information to and from wireless switching center 211 and location client 212. In addition, transceiver 303 enables location server 213 to transmit information to and receive information from wireless terminal 201 and base stations 202-1 and 202-2 via wireless switching center 211. It will be clear to those skilled in the art how to make and use transceiver 303.

Radio Frequency Maps of the Illustrative Embodiment—

FIGS. 4A-4D depict a plurality of radio frequency (RF) maps wherein each map represents a partitioning of geographic region 220 into 28 square locations. The maps are maintained as part of Location-Trait Database 313. In general, each map associates:
  i. a plurality of possible locations of wireless terminal 201, with
  ii. a predicted value of a location-dependent trait for each of the possible locations.

In other words, when wireless terminal 201 is at an unknown location, an empirical measurement of the location-dependent trait is a "fingerprint" or "signature" that can be used, in conjunction with the map, to estimate the location of the wireless terminal.

In accordance with the illustrative embodiment of the present invention, the location-dependent trait is the received signal strength as measured in dBm, and each map associates each possible location of wireless terminal with the predicted received signal strength of one signal as transmitted from one infrastructure antenna (i.e., base station 201-1 antenna, base station 201-2 antenna, distributed antenna 203, repeater antenna 204), as a function of the calendrical time, T, and the environmental conditions, N. With this in mind, FIG. 4A indicates the mapping of the signal radiated by the antenna of base station 202-1 at Noon on a sunny day, FIG. 4B indicates the mapping of the signal radiated by distributed antenna 203 at Noon on a sunny day, FIG. 4C indicates the mapping of the signal radiated by the antenna of base station 202-2 at Noon on a sunny day, and FIG. 4D indicates the mapping of the signal radiated by the antenna of repeater antenna 204 at Noon on a sunny day. How each map is generated is described below and in FIG. 6.

It will, however, be clear to those skilled in the art, after reading this specification, how to make and use alternative embodiments of the present invention in which one or more of the following predicted traits are used, instead of or in addition to the trait of received signal strength:

i. the predicted pathloss of all of the signals receivable by wireless terminal 201 when wireless terminal 201 is at the location, from all transmitters (e.g., base stations 202-1 and 202-2, distributed antenna 203, repeater antenna 204, commercial television, commercial radio, navigation, ground-based aviation, etc.), as a function of the calendrical time, T, and the environmental conditions, N; and ii. the predicted pathloss of all of the signals transmitted by wireless terminal 201 when wireless terminal 201 is in the location as receivable at base stations 202-1 and 202-2, distributed antenna 203, and repeater antenna 204, as a function of the calendrical time, T, and the environmental conditions, N; and iii. the predicted received signal strength of all of the signals transmitted by wireless terminal 201 when wireless terminal 201 is in the location as receivable at base stations 202-1 and 202-2, distributed antenna 203, and repeater antenna 204, as a function of the calendrical time, T, and the environmental conditions, N; and iv. the predicted received signal-to-impairment ratio (e.g., Eb/No, etc.) of all of the signals receivable by wireless terminal 201 when wireless terminal 201 is in the location, from all transmitters, as a function of the calendrical time, T, and the environmental conditions, N; and v. the predicted received signal-to-impairment ratio of all of the signals transmitted by wireless terminal 201 when wireless terminal 201 is in the location as receivable at base stations 202-1 and 202-2, distributed antenna 203, and repeater antenna 204, as a function of the calendrical time, T, and the environmental conditions, N; and vi. the predicted received temporal difference of each pair of multipath components (e.g., one temporal difference for one pair of multipath components, a pair of temporal differences for a triplet of multipath components, etc.) of all of the signals receivable by wireless terminal 201 when wireless terminal 201 is in the location, from all transmitters, as a function of the calendrical time, T, and the environmental conditions, N; and vii. the predicted received temporal difference of each pair of multipath components (e.g., one temporal difference for one pair of multipath components, a pair of temporal differences for a triplet of multipath components, etc.) of all of the signals transmitted by wireless terminal 201 when wireless terminal 201 is in the location as receivable at base stations 202-1 and 202-2, distributed antenna 203, and repeater antenna 204, as a function of the calendrical time, T, and the environmental conditions, N; and viii. the predicted received delay spread (e.g., RMS delay spread, excess delay spread, mean excess delay spread, etc.) of all of the signals receivable by wireless terminal 201 when wireless terminal 201 is in the location, from all transmitters, as a function of the calendrical time, T, and the environmental conditions, N; and ix. the predicted received delay spread (e.g., RMS delay spread, excess delay spread, mean excess delay spread, etc.) of all of the signals transmitted by wireless terminal 201 when wireless terminal 201 is in the location as receivable at base stations 202-1 and 202-2, distributed antenna 203, and repeater antenna 204, as a function of the calendrical time, T, and the environmental conditions, N; and x. the predicted received relative arrival times of two or more multipath components of all of the signals receivable by wireless terminal 201 when wireless terminal 201 is in the location, from all transmitters (which can be determined by a rake receiver in well-known fashion), as a function of the calendrical time, T, and the environmental conditions, N; and xi. the predicted received relative arrival times of two or more multipath components of all of the signals transmitted by wireless terminal 201 when wireless terminal 201 is in the location as receivable at base stations 202-1 and 202-2, distributed antenna 203, and repeater antenna 204, as a function of the calendrical time, T, and the environmental conditions, N; and xii. the predicted round-trip time of all of the signals transmitted and receivable by wireless terminal 201 through base stations 202-1 and 202-2, distributed antenna 203, and repeater antenna 204, as a function of the calendrical time, T, and the environmental conditions, N; and xiii. the predicted round-trip time of all of the signals transmitted and receivable by base stations 202-1 and 202-2, distributed antenna 203, and repeater antenna 204 through wireless terminal 201, as a function of the calendrical time, T, and the environmental conditions, N; and xiv. the identity of the base stations that provide telecommunications service to the location, as a function of the calendrical time, T, and the environmental conditions, N; and xv. the identities of the neighboring base stations that provide telecommunications service to the location, as a function of the calendrical time, T, and the environmental conditions, N; and xvi. the handover state (e.g., soft, softer, 1×, 2×, etc.) of wireless terminal 201 and wireless telecommunication system 200 when wireless terminal 201 is in the location as a function of the calendrical time, T, and the environmental conditions, N.

As already described, distributed antenna 203 and repeater antenna 204 radiate signal content that is similar or identical to that radiated by at least one of the infrastructure antennas collocated with base stations 202-1 and 202-2, respectively. Therefore, it would be advantageous to disambiguate the radiating source of the signal received by wireless terminal 201. In accordance with the illustrative embodiment, location server 213 disambiguates the radiating source as described in detail below.

Operation of the Illustrative Embodiment—

Figure 5:
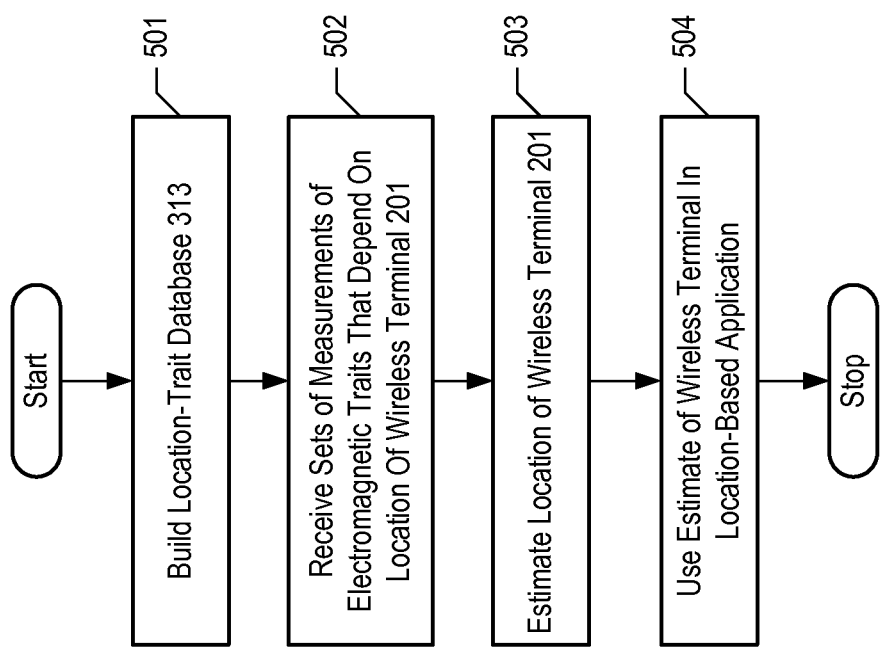
FIG. 5 depicts a flowchart of the salient processes performed in accordance with the illustrative embodiment of the present invention.

FIG. 5 depicts a flowchart of the salient processes performed in accordance with the illustrative embodiment of the present invention. The details of the illustrative location estimation technique that are not described herein are described in U.S. Pat. No. 7,257,414, which is incorporated herein by reference.

The processes performed by location server 213 are depicted in the drawings (i.e., FIG. 5 and subsequent figures) as being performed in a particular order. It will, however, be clear to those skilled in the art, after reading this disclosure, that such operations can be performed in a different order than depicted or can be performed in a non-sequential order (e.g., in parallel, etc.). In some embodiments of the present invention, some or all of the depicted processes might be combined or performed by different devices. In some embodiments of the present invention, some of the depicted processes might be omitted.

In accordance with process 501, location server 213 builds Location-Trait Database 313. For the purposes of this specification, the "Location-Trait Database" is defined as a database of maps (e.g., those that are described above and in FIGS. 4A-4D, etc.) that associate each of a plurality of locations to one or more predicted traits associated with a wireless terminal at that location. The details of building Location-Trait Database 313 are described below and in FIG. 6.

In accordance with process 502, location server 213 receives empirical measurements of location-dependent traits that depend on the location of wireless terminal 201. Location server 213 receives Y non-empty sets of measurements of the traits associated with wireless terminal 201. Each set of measurements is made at one of instants $H_1$ through $H_Y$. The measurements made at instants $H_1$ through $H_Y$ are used as part of a time-series analysis for estimating the location of terminal 201, as described in detail below and with respect to process 703.

In accordance with the illustrative embodiment, each set of measurements comprises a measure of a propagation delay of a signal traveling between wireless terminal 201 and at least one of base stations 202-1 and 202-2. In some embodiments of the present invention, the measure of the propagation delay is of a signal that travels between terminal 201 and a depicted base station via exactly one of i) a first infrastructure antenna through which wireless telecommunications service is provided, and ii) a second infrastructure antenna through which wireless telecommunications service is provided. For example, the first infrastructure antenna corresponds to an antenna collocated with base station 202-1, and the second infrastructure antenna corresponds to distributed antenna 203 As another example, the first infrastructure antenna corresponds to an antenna collocated with base station 202-2, and the second infrastructure antenna corresponds to repeater antenna 204.

In accordance with the illustrative embodiment, the measure of the propagation delay comprises a timing advance component (e.g., as specified in the GSM standards, etc.).

Each set of measurements further comprises the received signal strength of all of the signals received and decoded by wireless terminal 201.

In accordance with the illustrative embodiment, wireless terminal 201 provides its measurements directly to location server 213 via the user plane and in response to a request from location server 213 to do so. This is advantageous because the quality of the estimate of the location of wireless terminal 201 is enhanced when there are no limitations on the nature, number, or dynamic range of the measurements—as might occur when measurements are required to be made in accordance with the air-interface standard. It will be clear to those skilled in the art, however, after reading this disclosure, how to make and use alternative embodiments of the present invention in which wireless terminal 201 provides its measurements periodically, sporadically, or in response to some other event. Furthermore, it will be clear to those skilled in the art, after reading this disclosure, how to make and use alternative embodiments of the present invention in which wireless terminal 201 provides its measurements to location server 213 via the GSM air-interface protocol.

In accordance with the illustrative embodiment, base stations 202-1 and 202-2 provide their measurements to location server 213 via wireless switching center 211 and in response to a request from location server 213 to do so. It will be clear to those skilled in the art, however, after reading this disclosure, how to make and use alternative embodiments of the present invention in which base stations 202-1 and 202-2 provide their measurements to location server 213 periodically, sporadically, or in response to some other event.

As part of process 502, location server 213 also receives from wireless terminal 201:
 i. the identities of the base stations that provide service to wireless terminal 201 at each of instants $H_1$ through $H_Y$, and
 ii. the identities of the neighboring base stations that provided service to the location of wireless terminal 201 at each of instants $H_1$ through $H_Y$.

This information is used by location server 213 in performing search area reduction, which is described in detail below and in FIG. 8.

In some embodiments of the present invention, location server 213 corrects systemic errors in the measurements received in process 502.

In some embodiments of the present invention, location server 213 computes the differentials, in those cases that are appropriate, of the measurements to correct situational errors in the measurements received in process 502. Many factors, including the condition of wireless terminal 201's antenna, the state of its battery, and whether or not the terminal is inside a vehicle can introduce situational measurement errors. This is particularly true for measurements of pathloss and signal strength.

In accordance with process 503, location server 213 estimates the location of wireless terminal 201 based on location-trait database 313 and a variety of traits that vary based on the location of wireless terminal 201. The details of process 503 are described below and in FIG. 7.

In accordance with process 504, the estimate of the location of wireless terminal 201 is used in a location-based application, such as and without limitation, E 9-1-1 service. Location server 213 transmits the estimate to the location-based application.

Building Location-Trait Database 313—

Figure 6:
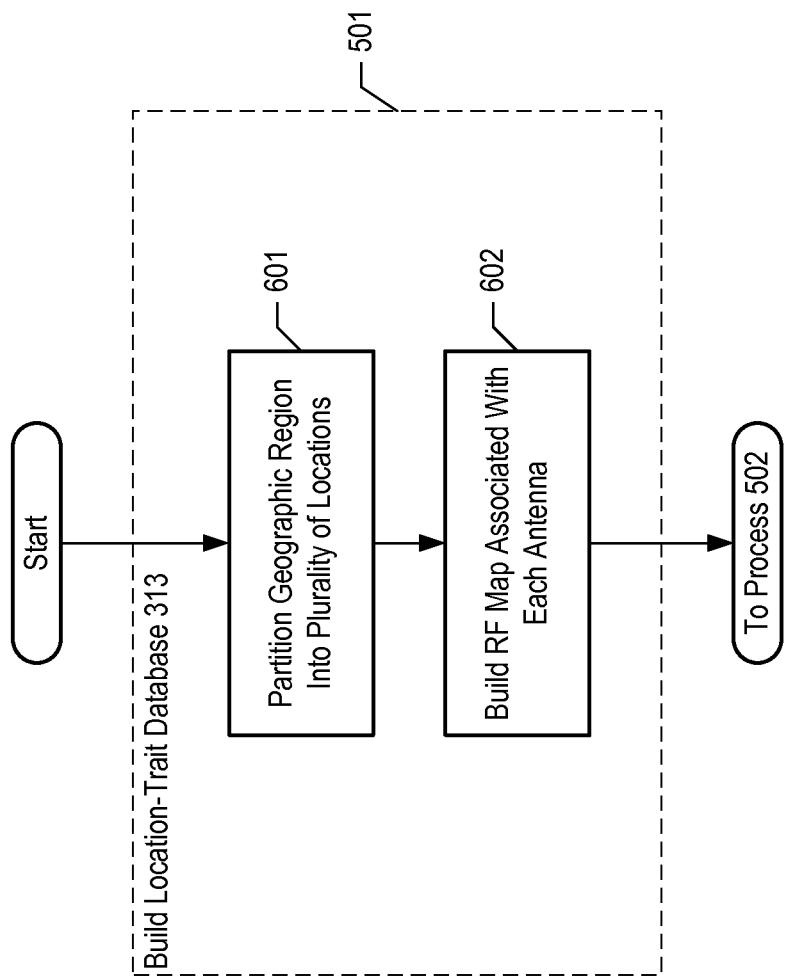
FIG. 6 depicts a flowchart of the salient processes performed in accordance with process 501.

FIG. 6 depicts a flowchart of the salient processes performed in accordance with process 501—building Location-Trait Database 313.

In accordance with process 601, geographic region 220 is partitioned into B(T,N) locations, such as the 28 locations depicted in each of FIGS. 4A-4D, wherein B(T,N) is a positive integer greater than one, and wherein B(T,N) varies as a function of calendrical time T and the environmental conditions N. It will be clear to those skilled in the art, after reading this disclosure, how to make and use alternative embodiments of the present invention in which the number of locations that geographic region 220 is partitioned into is static. Furthermore, it will be clear to those skilled in the art, after reading this disclosure, how to make and use alternative embodiments of the present invention in which the number of locations that geographic region 220 is partitioned into is not dependent on the calendrical time T or the environmental conditions N.

Some traits of the radio frequency spectrum and of individual signals are different at different locations in geographic region 220. Similarly, some traits of the radio frequency spectrum and of individual signals transmitted by wireless terminal 201 change at base stations 202-1 and 202-2, distributed antenna 203, and repeater antenna 204 when wireless terminal 201 is at different locations. Furthermore, some traits (e.g., hand-off state, etc.) of wireless telecommunications system 200 change when wireless terminal 201 is at different locations.

Each location is described by:
 i. a unique identifier b,
 ii. its dimensionality (e.g., zero-dimension, one-dimension, two dimensions, three dimensions, etc.),
 iii. the coordinates (e.g., latitude, longitude, altitude, etc.) that define its scope (e.g., position, area, volume, etc.), which can be static or, alternatively, can vary as a function of calendrical time T or the environmental conditions N, or both the calendrical time T and the environmental conditions N,
 iv. the predicted value E(b, T, N, W, Q) for each trait, Q, when wireless terminal W is at location b at calendrical time T given environmental conditions, N, and
 v. the identities of its adjacent locations.

It will be clear to those skilled in the art, after reading this disclosure, how to make and use alternative embodiments of the present invention that partition geographic region 220 into any number of locations of any size, shape, and arrangement. Furthermore, it will be clear to those skilled in the art, after reading this disclosure, how to make and use embodiments of the present invention in which the locations are identical in size and shape.

In accordance with process 602, the predicted values E(b, T, N, W, Q) for the location-dependent traits are associated with each location, as described above and in FIGS. 4A-4D.

In accordance with the illustrative embodiment of the present invention, all signals transmitted by wireless terminal 201 are for communicating with base stations 202-1 and 202-2, and all of the signals received by wireless terminal 201 are:
 i. signals transmitted by base stations 202-1 and 202-2, distributed antenna 203, and repeater antenna 204 for communicating with wireless terminal 201,
 ii. television signals,
 iii. radio signals,
 iv. aviation signals, and
 v. navigation signals.

It will be clear to those skilled in the art, after reading this disclosure, how to make and use alternative embodiments of the present invention that use different signals.

In accordance with the illustrative embodiment, the predicted values of these traits are determined through a combination of:
 i. a plurality of theoretical and empirical radio-frequency propagation models, and
 ii. a plurality of empirical measurements of the traits within geographic region 220, in well-known fashion.

Estimating the Location of Wireless Terminal 201—

Figure 7:
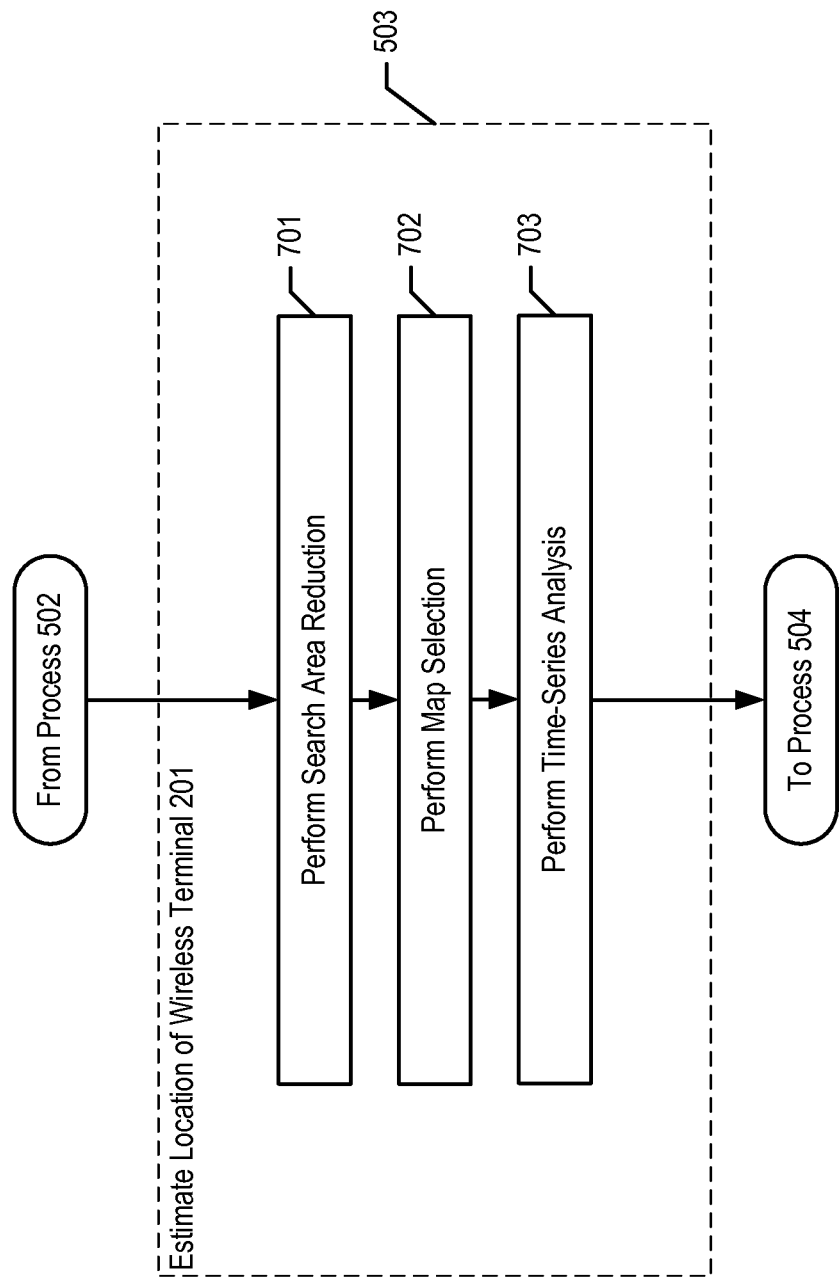
FIG. 7 depicts a flowchart of the salient processes performed in process 503.

FIG. 7 depicts a flowchart of the salient processes performed in process 503—estimating the location of wireless terminal 201. In accordance with the illustrative embodiment, process 503 is initiated by a request from location client 213 for the location of wireless terminal 201. It will be clear to those skilled in the art, however, after reading this disclosure, how to make and use alternative embodiments of the present invention in which process 503 is initiated periodically, sporadically, or in response to some other event.

In accordance with process 503, Y probability distributions for the location of wireless terminal 201 are generated for each of instants $H_1$ through $H_Y$ in the temporal interval $\Delta T$, wherein Y is a positive integer, based on comparing the measurements of traits associated with wireless terminal 201 at each of instants $H_1$ through $H_Y$ to predicted values for those traits at those times. Each of the Y probability distributions provides a first estimate of the probability that wireless terminal 201 is in each location at each of instants $H_1$ through $H_Y$.

In accordance with process 701, location server 213 performs a technique called "search area reduction" in preparation for process 703. To understand what search area reduction is and why it is advantageous, a brief discussion of process 703 is helpful. In process 703 location server 213 performs a time-series analysis in order to estimate the probability that wireless terminal 201 is in each location at each of instants $H_1$ through $H_Y$. This requires generating Y multi-dimensional probability distributions, one for each of instants $H_1$ through $H_Y$.

The process for generating each multi-dimensional probability distribution can be computationally intensive and the intensity depends on the number of locations that must be considered as possible locations for wireless terminal 201. When the number of locations that must be considered is small, the process can be performed quickly enough for many "real-time" applications. In contrast, when the number of locations that must be considered is large, the process can often take too long.

Nominally, all of the locations in geographic region 220 must be considered because, prior to process 701, wireless terminal 201 could be in any location out of possibly thousands, millions, or billions of locations. The consideration of thousands, millions, or billions of locations for each instant by location server 213 might take too long for many real-time applications.

Therefore, to expedite the performance of process 703, location server 213 performs one or more computationally-efficient tests that quickly and summarily eliminate many possible locations for wireless terminal 201 from consideration, and, therefore, summarily set to zero the probability that wireless terminal 201 is at those locations. This reduces the number of locations that must be fully considered in process 703 and generally improves the speed with which process 503 is performed.

Figure 8:
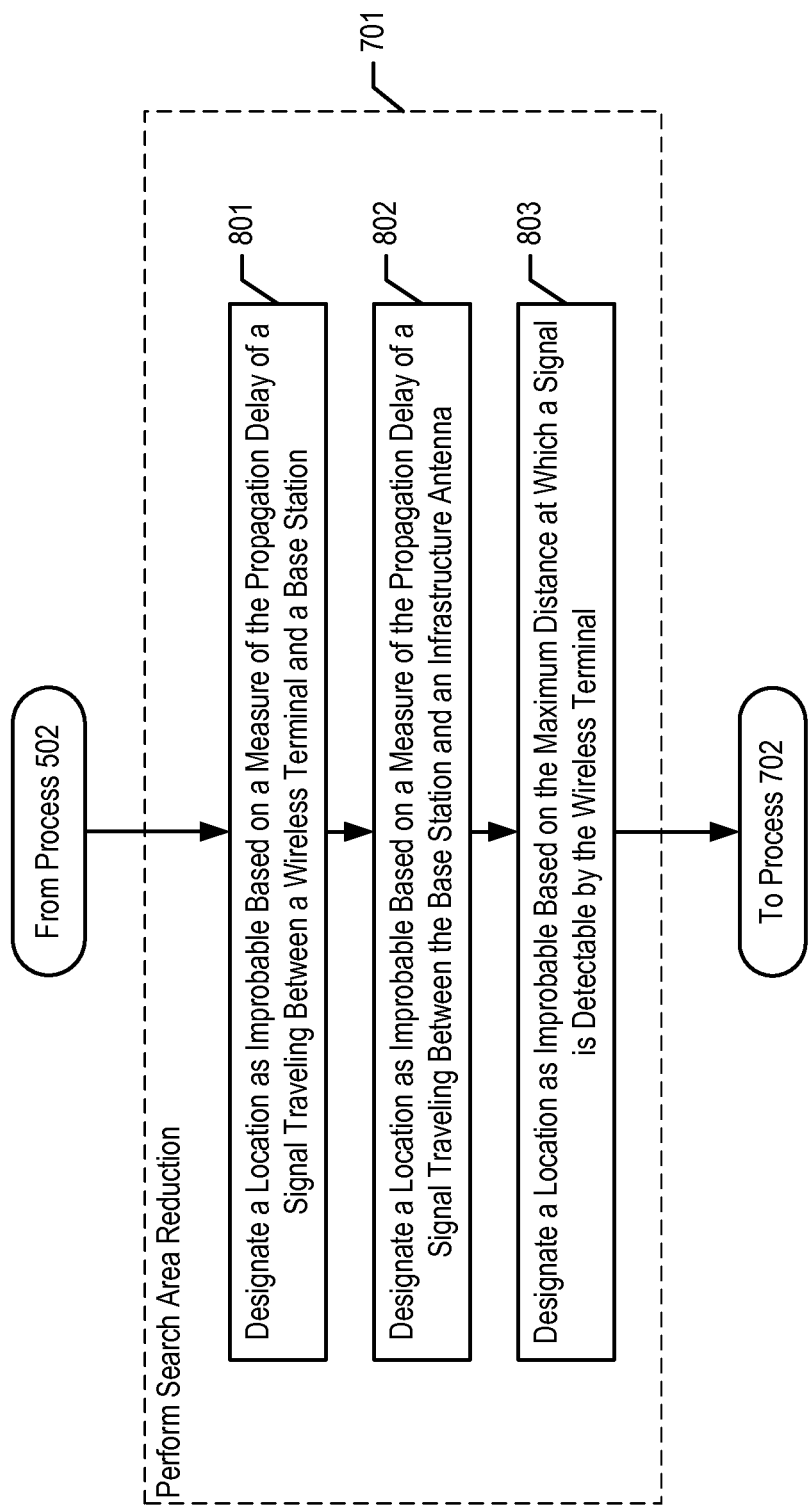
FIG. 8 depicts a flowchart of the salient processes performed in accordance with process 701.

FIG. 8 depicts a flowchart of the salient processes performed in accordance with process 701—search area reduction. In some embodiments of the present invention, location server 213 uses additional techniques to those described below, in order to perform search area reduction.

In accordance with process 801, location server 213 designates a location as improbable based on the measure of the propagation delay of a signal traveling between wireless terminal 201 and one of base stations 202-1 and 202-2, as received in accordance with process 502. In some embodiments of the present invention, location server 213 designates the location as improbable based on a comparison of i) the received measure to ii) the propagation delay of an electromagnetic signal traveling between the first infrastructure antenna and the second infrastructure antenna. For example, the first infrastructure antenna corresponds to an antenna collocated with base station 202-2, and the second infrastructure antenna corresponds to repeater antenna 204.

The theory underlying this test as it pertains to distributed antenna systems is that if the distance implied by the measure of the propagation delay is small relative to the cable delay in wireline transmission medium 203-3 (i.e., from base station 202-1 to distributed antenna 203), then the radiating source of the signal must have been base station 202-1—making one or more possible locations associated with distributed antenna 203 improbable. Similarly for the host-repeater configuration, if the distance implied by the measure of the propagation delay is small relative to the distance from (host) base station 202-2 to repeater antenna 204, then the radiating source of the signal must have been base station 202-2—making one or more possible locations associated with repeater antenna 204 improbable.

In accordance with process 802, location server 213 designates a location as improbable based on the measure of the propagation delay of a signal traveling i) between base station 202-1 and distributed antenna 203 or ii) between base station 202-2 and repeater antenna 204. The propagation of such a signal can be attributed, for example, to the cable delay contributed by wireline transmission medium 203-3 in the case of a distributed antenna system.

The theory underlying this test as it pertains to distributed antenna systems is that if the distance implied by the measure of the propagation delay is large relative to the cable delay in transmission medium 203-3 (i.e., from base station 202-1 to distributed antenna 203), then the radiating source of the signal must have been distributed antenna 203—making one or more possible locations associated with the antenna collocated with base station 202-1 improbable. For example, this can be because the distance implied by the received measure of propagation delay exceeds the maximum distance at which a signal radiated from an antenna at base station 202-1 might be expected to be detectable. A similar rationale applies for the host-repeater configuration.

In accordance with process 803, location server 213 designates a location as improbable based on the maximum distance at which a signal is detectable by wireless terminal 201, wherein the signal in this case is radiated from an infrastructure antenna (e.g., collocated with base station 202-1 or 202-2) that is used to provide wireless telecommunications service.

The theory underlying this test is that if the distance implied by the received measure of the propagation delay exceeds the maximum distance associated with a particular infrastructure antenna, then the radiating source of the signal must not have been that antenna. This is because the distance implied by the received measure of propagation delay exceeds the maximum distance at which a signal radiated from an antenna at base station 202-1 might be expected to be detectable—making one or more possible locations associated with base station 202-1 improbable. A similar rationale applies for the host-repeater configuration; that is, a location associated with base station 202-2 can be eliminated if the distance implied by the received measure of propagation delay exceeds the maximum distance at which a signal radiated from an antenna at base station 202-2 might be expected to be detectable—making one or more possible locations associated with base station 202-2 improbable.

A location that that is designated as improbable at instant $H_i$ by one or more of processes 801 through 803 is designated as improbable by process 701 at instant $H_i$.

Figure 9:
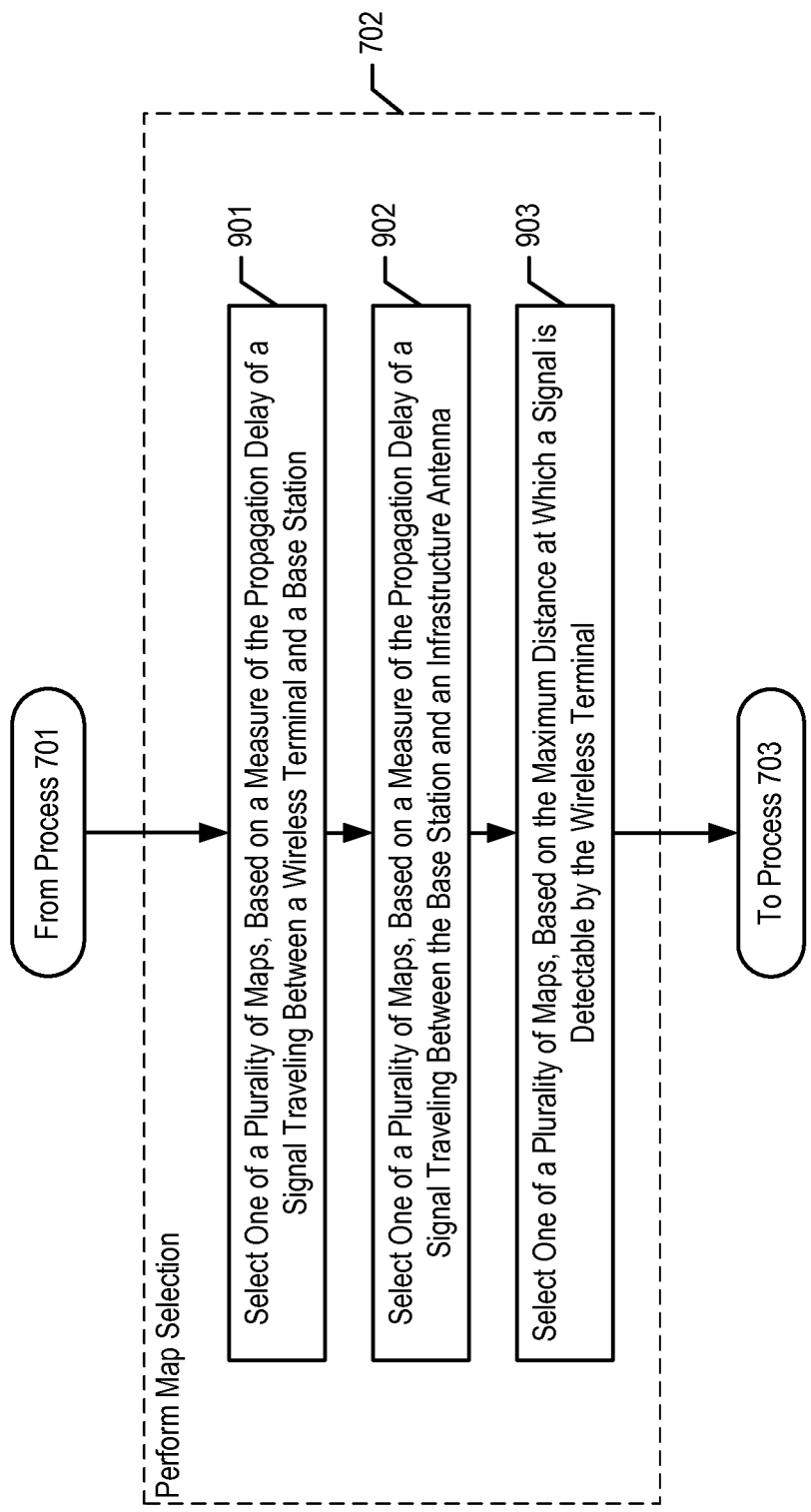
FIG. 9 depicts a flowchart of the salient processes performed in accordance with process 702.

FIG. 9 depicts a flowchart of the salient processes performed in accordance with process 702—map selection. In accordance with process 702, location server 213 selects a map in preparation for process 903. In particular, server 213 selects one of a plurality of maps that associate: i) a plurality of possible locations of wireless terminal 201 with ii) a predicted value of the location-dependent trait associated with each of the plurality of possible locations of the wireless terminal. Each map correlates each of a plurality of locations to one or more predicted traits associated with a wireless terminal at that location. As described above and in FIG. 6, the maps are stored as part of Location-Trait Database 313.

In accordance with the illustrative embodiment, location server 213 maintains a map for each infrastructure antenna—that is, the antennas collocated with base stations 202-1 and 202-2, distributed antenna 203, and repeater antenna 204. When wireless terminal 201 indicates that it is receiving a signal from a base station that i) has one or more distributed antennas or ii) is a host to one or more repeater antennas, or both, server 213 disambiguates the radiating antenna of the signal received by wireless terminal 201 and selects the map that corresponds to the radiating source. To accomplish this, location server 213 performs the processes as described below.

In accordance with process 901, location server 213 selects one of the plurality of maps stored in Location-Trait Database 313, based on the measure of the propagation delay of a signal traveling between wireless terminal 201 and one of base stations 202-1 and 202-2, as received in accordance with process 502. In some embodiments of the present invention, location server 213 selects the map based on a comparison of i) the received measure to ii) the propagation delay of an electromagnetic signal traveling between the first infrastructure antenna and the second infrastructure antenna. For example, the first infrastructure antenna corresponds to an antenna collocated with base station 202-2, and the second infrastructure antenna corresponds to repeater antenna 204.

The theory underlying this selection as it pertains to distributed antenna systems is that if the distance implied by the measure of the propagation delay is small relative to the cable delay in transmission medium 203-3 (i.e., from base station 202-1 to distributed antenna 203), then the radiating source of the signal must have been base station 202-1. Thus, the map corresponding to base station 202-1 is selected. Similarly for the host-repeater configuration, if the distance implied by the measure of the propagation delay is small relative to the distance from (host) base station 202-2 to repeater antenna 204, then the radiating source of the signal must have been base station 202-2. Thus, the map corresponding to base station 202-2 is selected.

In accordance with process 902, location server 213 selects one of the plurality of maps, based on the measure of the propagation delay of a signal traveling i) between base station 202-1 and distributed antenna 203 or ii) between base station 202-2 and repeater antenna 204. The propagation of such a signal can be attributed, for example, to the cable delay contributed by transmission medium 203-3 in the case of a distributed antenna system.

The theory underlying this selection as it pertains to distributed antenna systems is that if the distance implied by the measure of the propagation delay is large relative to the cable delay in transmission medium 203-3 (i.e., from base station 202-1 to distributed antenna 203), then the radiating source of the signal must have been distributed antenna 203. Thus, the map corresponding to distributed antenna 203 is selected. For example, this can be because the distance implied by the received measure of propagation delay exceeds the maximum distance at which a signal radiated from an antenna at base station 202-1 might be expected to be detectable. A similar rationale applies for the host-repeater configuration, resulting in the map corresponding to repeater antenna 204 being selected.

In accordance with process 903, location server 213 selects one of the plurality of maps, based on the maximum distance at which a signal is detectable by wireless terminal 201, wherein the signal in this case is radiated from an infrastructure antenna (e.g., collocated with base station 202-1 or 202-2) that is used to provide wireless telecommunications service.

The theory underlying this selection is that if the distance implied by the received measure of the propagation delay exceeds the maximum distance associated with a particular infrastructure antenna, then the radiating source of the signal must not have been that antenna. This is because the distance implied by the received measure of propagation delay exceeds the maximum distance at which a signal radiated from an antenna at base station 202-1 might be expected to be detectable. Thus, a map corresponding to an antenna other than the antenna collocated with base station 202-1 is selected. A similar rationale applies for the host-repeater configuration; that is, a location associated with base station 202-2 can be eliminated if the distance implied by the received measure of propagation delay exceeds the maximum distance at which a signal radiated from an antenna at base station 202-2 might be expected to be detectable. Thus, a map corresponding to an antenna other than the antenna collocated with base station 202-2 is selected.

In accordance with process 703, location server 213 performs time-series analysis by generating each of the Y probability distributions for wireless terminal 201 at each of instants $H_1$ through $H_Y$. In doing so, server 213 estimates the location of wireless terminal 201 based on i) measures of the location-dependent traits received by process 502, and ii) one or more possible locations of wireless terminal 201 not designated as improbable by process 701.

Location server 213 first sets the probability of wireless terminal 201 being at a location at instant $H_i$ to zero (0) if the location was designated as improbable at instant $H_i$ by process 701.

Location server 213 then compares the received measures of the location-dependent trait to the predicted values for that trait associated with one or more possible locations of wireless terminal 201 not designated as improbable.

In accordance with the illustrative embodiment, server 213 performs this comparison by generating the Euclidean norm between the measurements of a trait and the predicted values for that trait at all instants and for all locations not designated as improbable by process 701. To accomplish this, the Euclidean norm is generated between the measurements of the predicted values for those traits in Location-Trait Database 313 and specified in the map selected by process 702. To accomplish this, the Euclidean norm is generated as described in Equation 1:

$$V(b,H_i) = \sqrt{\Sigma((E(b,H_i,N,W,Q) - M(b,H_i,N,W,Q)) \cdot \omega(Q))^2} \quad \text{(Eq. 1)}$$

wherein $V(b,H_i)$ is the Euclidean norm for Location b at instant $H_i$ based on the square root of the sum of the square of the differences between each (corrected and differential, where appropriate) trait measurement $M(b, H_i, N, W, Q)$ minus the predicted value E(b, $H_i$, N, W, Q) for that trait, where ω(Q) is a weighting factor that indicates the relative weight to be given discrepancies in one trait versus discrepancies in the other traits.

Location server 213 generates the un-normalized probabilities of the location of wireless terminal 201 at each location, based on the Euclidean norms generated above, as shown in Equation 2.

$$UP(b, H_i) = e^{\left(\frac{-V^2(b, H_i)}{\delta^2}\right)} \quad \text{(Eq. 2)}$$

wherein UP(b,$H_i$) represents the un-normalized probability that wireless terminal 201 is in Location b at instant $H_i$, and wherein $\delta^2$ equals:

$$\delta^2 = \delta_E^2 + \delta_M^2 \quad \text{(Eq. 3)}$$

wherein $\delta_E^2$ is the square of the uncertainty in the error in Location-Trait Database and $\delta_M^2$ is the square of the uncertainty in the calibrated measurements. It will be clear to those skilled in the art, after reading this disclosure, how to generate $\delta^2$.

Location server 213 normalizes the probabilities generated above, as described in Equation 4.

$$NP(b, H_i) = \frac{UP(b, H_i)}{\sum UP(b, H_i)} \quad \text{(Eq. 4)}$$

wherein NP(b,$H_i$) represents the normalized probability that wireless terminal 201 is in Location b.

Location server 213 generates an estimate of the location of wireless terminal 201 at instant $H_1$ based on the maximum likelihood function of the normalized probability distribution at instant $H_1$.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A method comprising:
   receiving, by a data processing system, a measure of a location-dependent trait of a first signal that is received by a wireless terminal;
   designating, by the data processing system, at least one of a plurality of possible locations of the wireless terminal as improbable based on a measure of a propagation delay of a second signal traveling between a base station and an infrastructure antenna that is used to provide wireless telecommunications service; and
   estimating, by the data processing system, the location of the wireless terminal based on:
   (i) the measure of the location-dependent trait of the first signal, and
   (ii) one or more possible locations of the wireless terminal not designated as improbable.

2. The method of claim 1 wherein estimating the location of the wireless terminal comprises comparing:
   (i) the measure of the location-dependent-trait of the first signal to
   (ii) a predicted value of the location-dependent trait associated with one or more possible locations of the wireless terminal not designated as improbable.

3. The method of claim 1 wherein designating at least one of a plurality of possible locations of the wireless terminal as improbable is also based on the maximum distance at which a third signal is detectable by the wireless terminal, wherein the third signal is radiated from the infrastructure antenna.

4. The method of claim 1 wherein the infrastructure antenna is a distributed antenna.

5. The method of claim 1 wherein the infrastructure antenna is a repeater antenna.

6. A method comprising:
   receiving, by a data processing system, a measure of a location-dependent trait of a first signal that is received by a wireless terminal;
   selecting, by the data processing system, based on a measure of a propagation delay of a second signal traveling between a base station and an infrastructure antenna that is used to provide wireless telecommunications service, one of a plurality of maps that associate:
   (i) a plurality of possible locations of the wireless terminal with
   (ii) a predicted value of the location-dependent trait associated with each of the plurality of possible locations of the wireless terminal; and
   estimating, by the data processing system, the location of the wireless terminal based on a comparison of:
   (i) the measure of the location-dependent-trait of the first signal to
   (ii) the predicted value of the location-dependent trait associated with each of the plurality of possible locations of the wireless terminal.

7. The method of claim 6 wherein selecting a map is also based on the maximum distance at which a third signal is detectable by the wireless terminal, wherein the third signal is radiated from the infrastructure antenna.

8. The method of claim 6 wherein the infrastructure antenna is a distributed antenna.

9. The method of claim 6 wherein the infrastructure antenna is a repeater antenna.

10. A method comprising:
    receiving, by a data processing system, a measure of a location-dependent trait of a first signal that is received by a wireless terminal;
    designating, by the data processing system, at least one of a plurality of possible locations of the wireless terminal as improbable based on the maximum distance at which a second signal is detectable by the wireless terminal, wherein the second signal is radiated from an infrastructure antenna that is used to provide wireless telecommunications service; and
    estimating, by the data processing system, the location of the wireless terminal based on:
    (i) the measure of the location-dependent trait of the first signal, and
    (ii) one or more possible locations of the wireless terminal not designated as improbable.

11. The method of claim 10 wherein estimating the location of the wireless terminal comprises comparing:
    (i) the measure of the location-dependent-trait of the first signal to
    (ii) a predicted value of the location-dependent trait associated with one or more possible locations of the wireless terminal not designated as improbable.

12. The method of claim 10 wherein the infrastructure antenna is a distributed antenna.

13. The method of claim 10 wherein the infrastructure antenna is a repeater antenna.

14. A method comprising:
receiving, by a data processing system, a measure of a location-dependent trait of a first signal that is received by a wireless terminal;
selecting, by the data processing system, one of a plurality of maps that associate:
  (i) a plurality of possible locations of the wireless terminal with
  (ii) a predicted value of the location-dependent trait associated with each of the plurality of possible locations of the wireless terminal,
based on the maximum distance at which a second signal is detectable by the wireless terminal, wherein the second signal is radiated from an infrastructure antenna that is used to provide wireless telecommunications service; and
estimating, by the data processing system, the location of the wireless terminal based on a comparison of:
  (i) the measure of the location-dependent-trait of the first signal to
  (ii) the predicted value of the location-dependent trait associated with each of the plurality of possible locations of the wireless terminal.

15. The method of claim 14 wherein the infrastructure antenna is a distributed antenna.

16. The method of claim 14 wherein the infrastructure antenna is a repeater antenna.

17. An apparatus comprising:
a receiver for receiving:
  a measure of a location-dependent trait of a first signal that is received by a wireless terminal; and
a processor for:
  (i) designating at least one of a plurality of possible locations of the wireless terminal as improbable based on a measure of a propagation delay of a second signal traveling between a base station and an infrastructure antenna that is used to provide wireless telecommunications service, and for
  (ii) estimating the location of the wireless terminal based on:
    (a) the measure of the location-dependent trait of the first signal, and
    (b) one or more possible locations of the wireless terminal not designated as improbable.

18. The apparatus of claim 17 wherein estimating the location of the wireless terminal comprises comparing:
  (i) the measure of the location-dependent-trait of the first signal to
  (ii) a predicted value of the location-dependent trait associated with one or more possible locations of the wireless terminal not designated as improbable.

19. The apparatus of claim 17 wherein designating at least one of a plurality of possible locations of the wireless terminal as improbable is also based on the maximum distance at which a third signal is detectable by the wireless terminal, wherein the third signal is radiated from the infrastructure antenna.

20. The apparatus of claim 17 wherein the infrastructure antenna is a distributed antenna.

21. The apparatus of claim 17 wherein the infrastructure antenna is a repeater antenna.

22. An apparatus comprising:
a receiver for receiving:
  a measure of a location-dependent trait of a first signal that is received by a wireless terminal; and
a processor for:
  (i) selecting, based on a measure of a propagation delay of a second signal traveling between a base station and an infrastructure antenna that is used to provide wireless telecommunications service, one of a plurality of maps that associate:
    (a) a plurality of possible locations of the wireless terminal with
    (b) a predicted value of the location-dependent trait associated with each of the plurality of possible locations of the wireless terminal, and for
  (ii) estimating the location of the wireless terminal based on a comparison of:
    (a) the measure of the location-dependent-trait of the first signal to
    (b) the predicted value of the location-dependent trait associated with each of the plurality of possible locations of the wireless terminal.

23. The apparatus of claim 22 wherein selecting a map is also based on the maximum distance at which a third signal is detectable by the wireless terminal, wherein the third signal is radiated from the infrastructure antenna.

24. The apparatus of claim 22 wherein the infrastructure antenna is a distributed antenna.

25. The apparatus of claim 22 wherein the infrastructure antenna is a repeater antenna.

26. An apparatus comprising:
a receiver for receiving:
  a measure of a location-dependent trait of a first signal that is received by a wireless terminal; and
a processor for:
  (i) designating at least one of a plurality of possible locations of the wireless terminal as improbable based on the maximum distance at which a second signal is detectable by the wireless terminal, wherein the second signal is radiated from an infrastructure antenna that is used to provide wireless telecommunications service, and for
  (ii) estimating the location of the wireless terminal based on:
    (a) the measure of the location-dependent trait of the first signal, and
    (b) one or more possible locations of the wireless terminal not designated as improbable.

27. The apparatus of claim 26 wherein estimating the location of the wireless terminal comprises comparing:
  (i) the measure of the location-dependent-trait of the first signal to
  (ii) a predicted value of the location-dependent trait associated with one or more possible locations of the wireless terminal not designated as improbable.

28. The apparatus of claim 26 wherein the infrastructure antenna is a distributed antenna.

29. The apparatus of claim 26 wherein the infrastructure antenna is a repeater antenna.

30. An apparatus comprising:
a receiver for receiving:
  a measure of a location-dependent trait of a first signal that is received by a wireless terminal; and
a processor for:
  (i) selecting one of a plurality of maps that associate:
    (a) a plurality of possible locations of the wireless terminal with
    (b) a predicted value of the location-dependent trait associated with each of the plurality of possible locations of the wireless terminal, based on the maximum distance at which a second signal is detectable by the wireless terminal, wherein the second signal is radiated from an infrastructure antenna that is used to provide wireless telecommunications service, and for (ii) estimating the location of the wireless terminal based on a comparison of:

(a) the measure of the location-dependent-trait of the first signal to (b) the predicted value of the location-dependent trait associated with each of the plurality of possible locations of the wireless terminal.

31. The apparatus of claim 30 wherein the infrastructure antenna is a distributed antenna.

32. The apparatus of claim 30 wherein the infrastructure antenna is a repeater antenna.

* * * * *